US012755335B2

(12) United States Patent
Wang et al.

(10) Patent No.: US 12,755,335 B2
(45) Date of Patent: Oct. 6, 2026

(54) VIDEO GENERATION WITH LATENT DIFFUSION MODELS

(71) Applicant: Lemon Inc., Grand Cayman (KY)

(72) Inventors: Wei Min Wang, Singapore (SG); Daquan Zhou, Los Angeles, CA (US); Jiashi Feng, Singapore (SG)

(73) Assignee: Lemon Inc., Grand Cayman (KY)

( * ) Notice: Subject to any disclaimer, the term of this patent is extended or adjusted under 35 U.S.C. 154(b) by 630 days.

(21) Appl. No.: 18/056,444

(22) Filed: Nov. 17, 2022

(65) Prior Publication Data

US 2024/0169479 A1 May 23, 2024

(51) Int. Cl.
*G06T 3/40* (2024.01)
*G06T 3/4007* (2024.01)
*G06T 3/4053* (2024.01)

(52) U.S. Cl.
CPC .......... *G06T 3/4007* (2013.01); *G06T 3/4053* (2013.01)

(58) Field of Classification Search
CPC ....... G06T 3/4007; G06T 3/4053; G06T 3/16; G06V 20/40; G06V 20/46; G06V 20/62; G06V 30/1914; G06V 30/19147; G06V 10/774
See application file for complete search history.

(56) References Cited

U.S. PATENT DOCUMENTS

2014/0369596 A1* 12/2014 Siskind .................. G06V 10/85 382/158
2020/0097766 A1* 3/2020 Min ....................... G06V 20/46
2021/0272599 A1* 9/2021 Patterson ............... G06N 3/091
2021/0390945 A1* 12/2021 Zhang ................... G10L 13/027
2022/0189173 A1* 6/2022 Zhou ...................... G06V 20/47

OTHER PUBLICATIONS

Singer U, Polyak A, Hayes T, Yin X, An J, Zhang S, Hu Q, Yang H, Ashual O, Gafni O, Parikh D. Make-a-video: Text-to-video generation without text-video data. arXiv preprint arXiv:2209.14792. Sep. 29, 2022. (Year: 2022).*

(Continued)

*Primary Examiner* — Ross Varndell
*Assistant Examiner* — Duy Tran
(74) *Attorney, Agent, or Firm* — Alleman Hall LLP

(57) ABSTRACT

The present disclosure provides systems and methods for video generation using latent diffusion machine learning models. Given a text input, video data relevant to the text input can be generated using a latent diffusion model. The process includes generating a predetermined number of key frames using text-to-image generation tasks performed within a latent space via a variational auto-encoder, enabling faster training and sampling times compared to pixel space-based diffusion models. The process further includes utilizing two-dimensional convolutions and associated adaptors to learn features for a given frame. Temporal information for the frames can be learned via a directed temporal attention module used to capture the relation among frames and to generate a temporally meaningful sequence of frames. Additional frames can be generated via a frame interpolation process for inserting one or more transition frames between two generated frames. The process can also include a super-resolution process for upsampling the frames.

16 Claims, 6 Drawing Sheets

(56) References Cited

OTHER PUBLICATIONS

Hong W, Ding M, Zheng W, Liu X, Tang J. Cogvideo: Large-scale pretraining for text-to-video generation via transformers. arXiv preprint arXiv:2205.15868. May 29, 2022. (Year: 2022).*
Wang M, Xing J, Su J, Chen J, Liu Y. Learning spatiotemporal and motion features in a unified 2d network for action recognition. IEEE Transactions on Pattern Analysis and Machine Intelligence. May 10, 2022;45(3):3347-62. (Year: 2022).*
Babaeizadeh, M. et al., "FitVid: Overfitting in Pixel-Level Video Prediction," arXiv:2106.13195v1, Cornell University, Jun. 24, 2021, 25 pages.
Birhane, A. et al., "Multimodal datasets: misogyny, pornography, and malignant stereotypes," arXiv:2110.01963v1, Cornell University, Oct. 5, 2021, 33 pages.
Carreira, J. et al., "Quo Vadis, Action Recognition? A New Model and the Kinetics Dataset," Proceedings of the 2017 IEEE Conference on Computer Vision and Pattern Recognition (CVPR), Jul. 21, 2017, Honolulu, Hawaii, 10 pages.
Clark, A. et al., "Adversarial Video Generation on Complex Datasets," Proceedings of the Eighth International Conference on Learning Representations, Apr. 26, 2020, Addis Ababa, Ethiopia, 21 pages.
Ding, M. et al., "CogView2: Faster and Better Text-to-Image Generation via Hierarchical Transformers," arXiv:2204.14217v2, Cornell University, May 27, 2022, 15 pages.
Harvey, W. et al., "Flexible Diffusion Modeling of Long Videos," Proceedings of the Thirty-sixth Conference on Neural Information Processing Systems, Nov. 29, 2022, New Orleans, Louisiana, 23 pages.
Hertz, A. et al., "Prompt-to-Prompt Image Editing with Cross Attention Control," arXiv:2208.01626v1, Cornell University, Aug. 2, 2022, 19 pages.
Ho, J. et al., "Cascaded Diffusion Models for High Fidelity Image Generation," Journal of Machine Learning Research, vol. 23 , Jan. 2022, 33 pages.
Ho, J. et al., "Denoising Diffusion Probabilistic Models," Proceedings of the 34th Conference on Neural Information Processing Systems, Dec. 6, 2020, Vancouver, Canada, 25 pages.
Ho, J. et al., "Imagen Video: High Definition Video Generation with Diffusion Models," arXiv:2210.02303v1, Cornell University, Oct. 5, 2022, 18 pages.
Ho, J. et al., "Video Diffusion Models," arXiv:2204.03458v2, Cornell University, Jun. 22, 2022, 15 pages.
Hong, W. et al., "CogVideo: Large-scale Pretraining for Text-to-Video Generation via Transformers," Proceedings of the The Eleventh International Conference on Learning Representations, May 1, 2023, 15 pages.
Kalchbrenner, N. et al., "Video Pixel Networks," Proceedings of the 34th International Conference on Machine Learning, Sydney, Australia, Aug. 6, 2017, 16 pages.
Kawar, B. et al., "Denoising Diffusion Restoration Models," Proceedings of the 36th Conference on Neural Information Processing Systems, Nov. 28, 2022, New Orleans, Lousiana, 32 pages.
Kawar, B. et al., "Imagic: Text-Based Real Image Editing with Diffusion Models," arXiv:2210.09276v2, Cornell University, Nov. 22, 2022, 16 pages.
Kumar, M. et al., "Videoflow: A Conditional Flow-Based Model for Stochastic Video Generation," Proceedings of the International Conference on Learning Representations, Apr. 30, 2020, Addis Ababa, Ethiopia, 18 pages.
Liew, J. et al., "MagicMix: Semantic Mixing with Diffusion Models," arXiv:2210.16056v1, Cornell University, Oct. 28, 2022, 16 pages.
Lin, Z. et al., "Frozen CLIP Models are Efficient Video Learners," Proceedings of the European Conference on Computer Vision, Oct. 23, 2022, Tel Aviv, Israel, 23 pages.
Lu, C. et al., "DPM-Solver: A Fast ODE Solver for Diffusion Probabilistic Model Sampling in Around 10 Steps," Proceedings of the 36th Conference on Neural Information Processing Systems, Nov. 28, 2022, New Orleans, Louisiana, 31 pages.
Lugmayr, A. et al., "RePaint: Inpainting using Denoising Diffusion Probabilistic Models," Proceedings of the 2022 Computer Vision and Pattern Recognition Conference, Jun. 21, 2022, New Orleans, Louisiana, 25 pages.
Mathieu, M. et al., "Deep Multi-Scale Video Prediction Beyond Mean Square Error," Proceedings of the 2016 International Conference on Learning Representations, May 2, 2016, San Juan, Puerto Rico, 14 pages.
Meng, C. et al., "SDEdit: Guided Image Synthesis and Editing with Stochastic Differential Equations," arXiv:2108.01073v2, Cornell University, Jan. 5, 2022, 33 pages.
Poole, B. et al., "DreamFusion: Text-to-3D Using 2D Diffusion," arXiv:2209.14988v1, Cornell University, Sep. 29, 2022, 18 pages.
Ramesh, A. et al., "Hierarchical Text-Conditional Image Generation with CLIP Latents," arXiv:2204.06125v1, Cornell University, Apr. 13, 2022, 27 pages.
Ranzato, M. et al., "Video (Language) Modeling: A Baseline for Generative Models of Natural Videos," arXiv:1412.6604v5, Cornell University, May 4, 2016, 15 pages.
Rombach, R. et al., "High-Resolution Image Synthesis with Latent Diffusion Models," 2022 Computer Vision and Pattern Recognition Conference, Jun. 19, 2022, New Orleans, Louisiana, 45 pages.
Saharia, C. et al., "Image Super-Resolution via Iterative Refinement," IEEE Transactions on Pattern Analysis and Machine Intelligence, Sep. 12, 2022, 28 pages.
Saharia, C. et al., "Photorealistic Text-to-Image Diffusion Models with Deep Language Understanding," arXiv:2205.11487v1, Cornell University, May 23, 2022, 46 pages.
Schuhmann, C. et al., "LAION-5B: An open large-scale dataset for training next generation image-text models," Proceedings of the 36th Conference on Neural Information Processing Systems, Nov. 28, 2022, New Orleans, Louisiana, 50 pages.
Singer, U. et al., "Make-a-Video: Text-to-Video Generation Without Text-Video Data," Proceedings of the 11th International Conference on Learning Representations, May 1, 2023, 13 pages.
Song, J. et al., "Denoising Diffusion Implicit Models," Proceedings of the 9th International Conference on Learning Representations, May 3, 2021, Vienna, Austria, 22 pages.
Song, Y. et al., "Score-Based Generative Modeling Through Stochastic Differential Equations," Proceedings of the 9th International Conference on Learning Representations, May 3, 2021, Vienna, Austria, 36 pages.
Tran, D. et al., "A Closer Look at Spatiotemporal Convolutions for Action Recognition," Proceedings of the 2018 IEEE/CVF Conference on Computer Vision and Pattern Recognition, Jun. 18, 2018, Salt Lake City, Utah, 10 pages.
Tulyakov, S. et al., "MoCoGAN: Decomposing Motion and Content for Video Generation," Proceedings of the 2018 IEEE/CVF Conference on Computer Vision and Pattern Recognition, Jun. 18, 2018, Salt Lake City, Utah, 13 pages.
Vahdat, A. et al., "Score-based Generative Modeling in Latent Space," Proceedings of the Thirty-fifth Conference on Neural Information Processing Systems, Dec. 6, 2021, 46 pages.
Vondrick, C. et al., "Generating Videos with Scene Dynamics," Proceedings of the 30th Conference on Neural Information Processing Systems, Dec. 5, 2016, Barcelona, Spain, 10 pages.
Wu, C. et al., "GODIVA: Generating Open-Domain Videos from nAtural Descriptions," arXiv:2104.14806v1, Cornell University, Apr. 30, 2021, 12 pages.
Wu, C. et al., "NUWA: Visual Synthesis Pre-training for Neural visUal World creAtion," Proceedings of the European Conference on Computer Vision, Oct. 23, 2022, Tel Aviv, Israel, 28 pages.
Yang, R. et al., "Diffusion Probabilistic Modeling for Video Generation," Transactions on Machine Learning Research, Nov. 2022, 21 pages.
Yu, J. et al., "Scaling Autoregressive Models for Content-Rich Text-to-Image Generation," arXiv:2206.10789v1, Cornell University, Jun. 22, 2022, 49 pages.
Zhu, J. et al., "Unpaired Image-to-Image Translation using Cycle-Consistent Adversarial Networks," Proceedings of the 2017 IEEE

(56) References Cited

OTHER PUBLICATIONS

International Conference on Computer Vision, Oct. 22, 2017, Venice, Italy, 18 pages.

* cited by examiner

VIDEO GENERATION WITH LATENT DIFFUSION MODELS

BACKGROUND

Generative models can be implemented in a variety of applications such as image-to-text generation, style transfer, image-to-image translation, and text-to-three-dimensional (3D) object generation. Recent studies on text-to-image generation have shown that large generative models, after being pre-trained on large datasets, are able to generate photorealistic contents that are highly matched with given text prompts. One subclass of these generative models includes diffusion models that are capable of achieving more diversified generated contents and of scaling to large model sizes and large datasets.

SUMMARY

Examples are disclosed that relate to video generation using latent diffusion machine learning models. Given a text input, video data relevant to the text input can be generated using a latent diffusion model. The process includes generating a predetermined number of key frames using text-to-image generation tasks performed within a latent space via a variational auto-encoder, enabling faster training and sampling times compared to pixel space-based diffusion models. The process further includes utilizing two-dimensional convolutions and associated adaptors to learn features for a given frame. Temporal information for the frames can be learned via a directed temporal attention module used to capture the relation among frames and to generate a temporally meaningful sequence of frames. Additional frames can be generated via a frame interpolation process for inserting one or more transition frames between two generated frames. The process can also include a super-resolution process for upsampling the frames.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
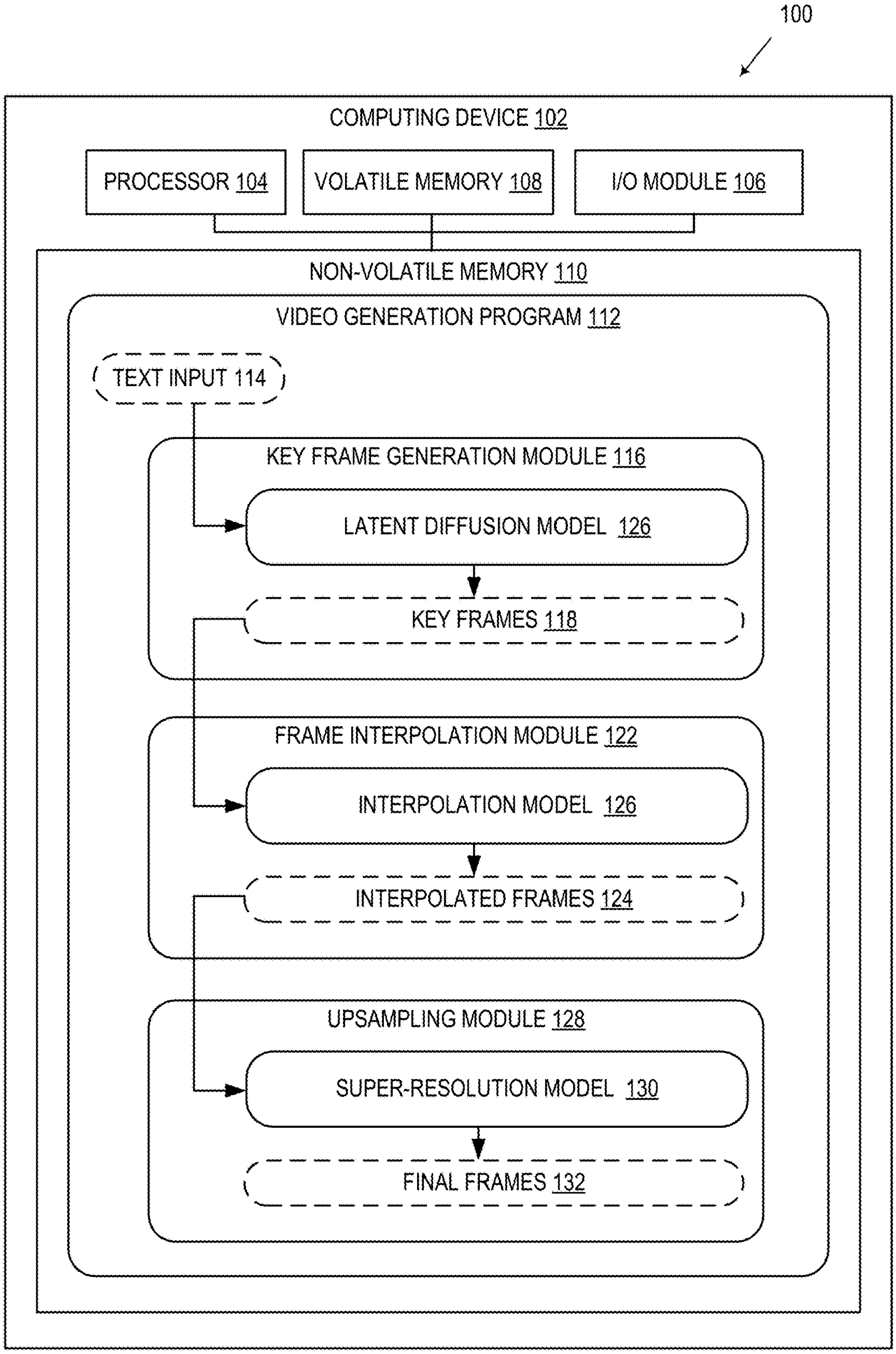
FIG. 1 shows a schematic view of an example computing system for video generation using latent diffusion models.

Despite its recent popularity in text-to-image generation tasks, the application of diffusion models and algorithms on video generation tasks presents difficult issues. One issue involves data scarcity as text-video datasets are much harder to collect compared to image-text datasets. Unlike images, videos are more difficult to describe with text descriptions. Furthermore, video datasets typically include videos, or clips, with a large number of frames being redundant and/or non-informative, resulting in reduced learning efficiency per computational time. Another issue includes the complex dynamics in video formats. Video datasets present visual dynamics that are more difficult to learn compared to still image contents. For example, the perception of every frame and the consistency among different frames are complex dynamics to be learned by the model. These dynamics are challenges absent in image datasets. Another issue in applying diffusion models to video generation tasks involves the associated high computational costs. Video data can contain hundreds or even thousands of frames depending on the length and quality of the video. Each frame has the same data complexity as an image with the same pixel dimensions. As such, directly processing videos involves a huge amount of computation and memory cost in comparison to processing a single image. One mitigating method for addressing the computational costs includes deploying a cascaded pipeline where small, coarse video frames are first generated and a separate super-resolution network can then be used to increase the spatial dimension. Even with this practice, the computational costs are still huge and impractical for general implementation.

In view of the observations above, the present disclosure provides examples of a video generation framework based on latent diffusion models. Given a text description, the framework generates a video with content relevant to the text description with improved data efficiency and sampling speed compared to previous methods. The framework can be configured to generate videos of different styles such as photorealistic interpretations of imaginary content. In some implementations, the framework uses a single model inference to generate high-spatial resolution video frames. For example, the framework can generate videos with a spatial resolution of 256×256 pixels. In some implementations, the framework generates videos with a spatial resolution of 1024×1024 pixels. A text-to-image model can be used as the feature extraction component for each frame in the video generation process. Such implementations significantly speed up the model's convergence and provide for a better final video generation performance in comparison to previous methods. In some implementations, the text-to-image model is pre-trained on a large dataset.

To make use of the prior knowledge from text-to-image generation tasks, the framework utilizes convolution operators in two-dimensional (2D) space. Unlike previous methods, the framework can operate without any added 3D convolutions. Since frames of a video mostly overlap in terms of content and features, independent neural blocks are not needed for the processing of the frames. The same 2D convolutions can be shared for the processing of the frames with the distribution of each frame's features adjusted using a unique set of learnable parameters, termed as an adaptor. In some implementations, the framework includes the use of a directed temporal self-attention module for learning temporal information. For example, future frames can be calculated based on all previous frames with the previous frames unaffected by the future frames. The directed temporal self-attention module can be used to capture the relations among frames and generate a temporally meaningful sequence of frames, providing an improved motion consistency compared to conventional self-attention modules. The whole generation process can be performed within a low-dimension latent space of a pre-trained variation auto-encoder, further boosting generation efficiency and reducing sampling time. The framework can further include a post-processing frame interpolation model for generating additional frames in the generated video.

FIG. 1 shows a schematic view of an example computing system 100 for video generation using latent diffusion models. The computing system 100 includes a computing device 102 that further includes a processor 104 (e.g., central processing units, or "CPUs"), an input/output (I/O) module 106, volatile memory 108, and non-volatile memory 110. The different components are operatively coupled to one another. The non-volatile memory 110 stores a video generation program 112, which contains instructions for the various software modules described herein for execution by the processor 104.

Upon execution by the processor 104, the instructions stored in the video generation program 112 cause the processor 104 to initialize the video generation process, which includes receiving a text input 114. The text input 114 can be received via the I/O module 106. The video generation program 112 includes a key frame generation module 116 that receives the text input 114. The key frame generation module 116 generates a predetermined number of key frames 118 with content generated based on the text input 114. In some implementations, the key frame generation module 116 generates sixteen key frames for each video. As can readily be appreciated, the key frame generation module 116 can be configured to generate more or fewer key frames for each video.

The key frames 118 can be generated using a latent diffusion model 120 that includes a convolutional network architecture such as a 3D U-Net decoder through a denoising diffusion process. The key frame generation process includes the use of 2D convolutions as opposed to 3D convolutions used in typical video data processing. The 2D convolutions can be implemented along with unique adaptors having learnable parameters for adjusting the features of each generated frame. In video data, the frames are often expected to change in a somewhat regular pattern along the temporal dimension, for example as an object undergoes continuous motion from left to right in a video. As such, the key frame generation process can also implement a directed self-attention design to provide temporal dependency among the generated key frames.

The generated key frames 118 are provided as input to a frame interpolation module 122. The frame interpolation module 122 generates and inserts additional transition frames in the generated key frames 118 to form an interpolated set of frames 124 with increased temporal resolution. The frame interpolation module 122 includes an interpolation model 126 for generating the transition frames. In some implementations, the interpolation model 126 is trained in latent space. The interpolation model can generate and insert a transition frame between two generated adjacent frames. The process can be repeated recursively to further increase the temporal resolution of the final video. In some implementations, the interpolation model generates and inserts more than one transition frame between the two generated adjacent frames.

The interpolated set of frames 124 can be provided as input to an upsampling module 128 for upsampling the spatial resolution of the interpolated frames 124. The upsampling module 128 can include a diffusion-based super-resolution model 130 trained on pixel space. In some implementations, the super-resolution model 130 is trained using an image dataset. The training of the super-resolution model using large-scale high-resolution image datasets can perform adequately well compared to traditional super-resolution models used in previous video generation tasks that have been trained on video datasets. The upsampling process can be configured to upsample the interpolated frames 124 into any desired spatial resolution. In some implementations, the super-resolution model is configured to upsample the input set of interpolated frames 124 to a spatial resolution of 1024×1024 pixels.

After the upsampling process, a final set of frames 132 and, consequently a video, with content relevant to the text input 114 is generated. As can readily be appreciated, the methods and modules described above can be used in isolation or in combination to generate video data with different spatial and temporal resolutions. For example, the upsampling process can be omitted if lower spatial resolution is desired over processing time. These methods and modules are described in the sections below in further detail.

Deep generative modeling aims to approximate the probability densities of a set of data via deep neural networks. The deep neural networks can be optimized to mimic the distribution from which the training data are sampled. Denoising diffusion probabilistic models (DDPM) are a family of latent generative models that approximate the probability densities of training data via the reversed processes of Markovian forward Gaussian diffusion processes. Given a set of training data $$\mathbb{D} = \{x^i\}_{i=1}^N,$$

for all $$i = 1, \ldots, N, x \in \mathbb{R}^d$$

and are independent and identically distributed from data distribution q(•). DDPM models the probability density q(x) as the marginal of the joint distribution between x and a series of latent variables $x_{1:T}$, $$p_\theta(x) = \int p_\theta(x_{0:T})dx_{1:T} \text{ with } x = x_0.$$

The joint distribution is defined as a Markov chain with learned Gaussian transitions starting from the standard normal distribution N(•; 0;1), i.e., $p_\theta(x_T)=N(x_T; 0;1)$, and $$p_\theta(x_{t-1} \mid x_t) \equiv \mathcal{N}\left(x_{t-1}; \mu_\theta(x_t, t), \sum\nolimits_\theta(x_t, t)\right).$$

To perform likelihood maximization of the parameterized marginal pθ(•), DDPM uses a fixed Markov Gaussian diffusion process, $q(x_{1:T}|x_0)$, to approximate the posterior $p_0(x_{1:T}|x_0)$. Specifically, two series, $$\alpha_{0:T} \text{ and } \sigma_{0:T}^2,$$

are defined, where $$1 =$$

$$\alpha_0 > \alpha_1 > \ \ldots\ > \alpha_T \geq 0 \text{ and } 0 = \sigma_0^2 < \sigma_1^2 < \ \ldots\ < \sigma_T^2. \text{ For any } t > s \geq 0, \quad q(x_t \mid x_s) = \mathcal{N}\left(x_t; \alpha_{t|s} x_s, \sigma_{t|s}^2 I\right),$$

where $$\alpha_{t|s} = \frac{a_t}{a_s}, \sigma_{t|s}^2 = .\sigma_t^2 - \alpha_{t|s}^2 \sigma_s^2.$$

Thus, $$q(x_t \mid x_0) = \mathcal{N}\left(x_t \mid \alpha_t x_0, \sigma_t^2 I\right).$$

The parameterized reversed process $p_\theta$ of DDPM can be optimized by maximizing the associated evidence lower bound (ELBO). By parameterizing the $p_\theta(x_{t-1}|x_t)$ as the form of posterior $q(x_{t-1}|x_t,x_0)$, the DDPM can be interpreted as iteratively removing noise signals to recover clean signals. The formulation above describes the modeling and training of an unconditional generative model. For the conditional case, the notations share similar forms by simply conditioning on a control signal y.

DDPMs can perform well in image/video generation and image editing. However, due to the many steps of iterations during sampling, the computational overhead of DDPMs becomes very high and impedes their applications. To improve the efficiency of DDPMs, several advanced sampling methods can be implemented by utilizing high-order stochastic differential equations (SDE)/ordinary differential equations (ODE) solvers. Other improvements can include the use of a latent diffusion model (LDM) that models the data distribution in a low-dimensional latent space. Denoising noisy data in a lower dimension may reduce the computational cost in the generation process.

LDMs can be implemented by first training an autoencoder E-D to map images x into a low-dimensional space and reconstruct images from latent codes z. The autoencoder can be jointly trained with a perceptual loss and a patch-based adversarial objective, enabling the spatial correspondence between latent codes and the original images. A DDPM with a time-conditional U-Net backbone can be used to model the distribution of the latent representations. To enable controllable/conditional generation, LDMs can use a domain-specific encoder τ(•) to project the control signal y (e.g., a text prompt) into an intermediate space and subsequently injects the embedding into the U-Net via a cross-attention layer.

Previous methods of video generation/prediction have been contemplated, including the use of GAN-based or auto-regressive methods to model the distributions of video frames in RGB or latent spaces. Diffusion-based generative models can also be applied to video modeling. For example, a 3D U-Net diffusion model architecture and a novel conditional sampling technique can be implemented for video generation. Some methods propose to model the conditional distribution of subsequent video frames given certain observed ones so that a long video can be synthesized by conditional sampling in an auto-regressive manner. Another method includes a two-step framework for video generation. First, a deterministic model is used to predict the next frame given observed ones. Then, a stochastic diffusion model is utilized to synthesize the residual for correcting the next frame prediction.

In terms of text-conditional video generation, methods have been proposed where a cascaded pipeline is utilized to synthesize high-definition videos. The pipeline includes a base text-to-video module, three spatial super-resolution (SSR), and three temporal super-resolution modules (TSR). The base text-to-video module utilizes temporal attention layers, while temporal convolutions are used in SSR and TSR modules. Another method proposes a multi-stage text-to-video generation method. First, a text-to-image model is used to generate image embeddings. Then, a low-resolution video generation model is trained with conditioning on the image embeddings. Finally, spatial and spatial-temporal super-resolution models are trained to synthesize high-definition videos. Both of these proposed methods model the video distribution in RGB space.

Example frameworks for video generation described herein include more efficient methods for text-conditional video generation. The framework includes the use of models for synthesizing videos in a low-dimensional latent space. The framework pipeline includes three main steps: key frame generation, frame interpolation, and super-resolution. For key frame generation, 2D convolution blocks are modified with weights pre-trained on text-image dataset to adapt to the 3D video dataset via adaptors. Then, a novel directed self-attention module is utilized to enable the model to learn the motions among frames within a clip. The generated key frames are interpolated to provide more smoothing of the video, and the spatial resolution of the generated frames can be increased via a separately trained super-resolution model.

Figure 2:
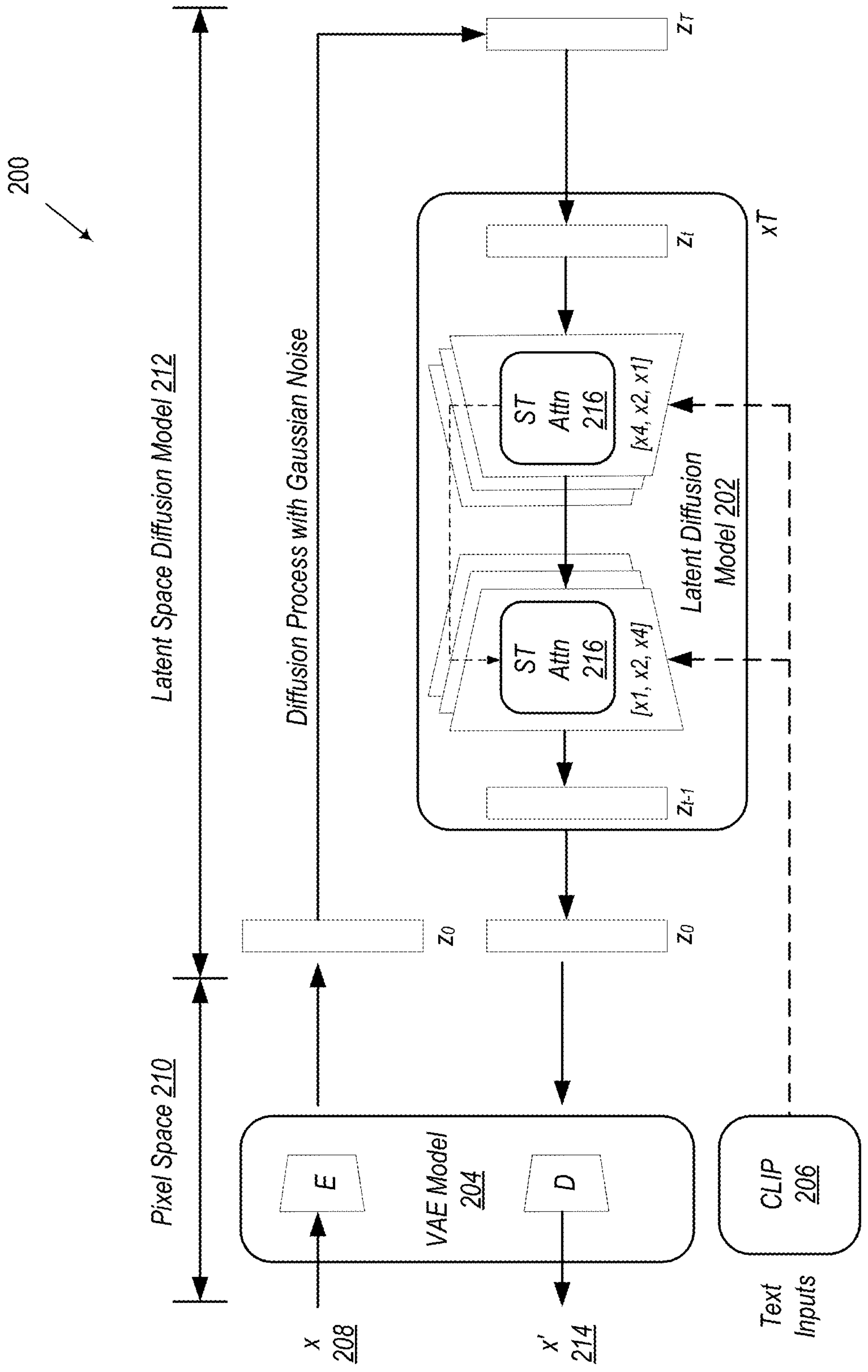
FIG. 2 shows a diagram schematically illustrating an example framework showing the data flow of training and inference phases.

FIG. 2 shows a diagram schematically illustrating an example framework 200 showing the data flow of training and inference phases. For ease of readability, $x_t$ denotes a set of video frames, short for $$x_t^{[F]} = \left[x_t^1, \ \ldots\ , x_t^F\right], \text{ where } x_t^i$$

means the i-th frame at time t. The encoder and decoder of the variational auto-encoder is denoted by ε and D respectively. The Contrastive Language-Image Pretraining (CLIP) used for the text encoding is denoted as τ(•) and the obtained embedding is denoted as τ(y). The decoder used for denoising is represented as $\varepsilon_\theta(z_t, t, y)$.

The framework 200 includes a latent diffusion model 202, a pre-trained variational auto-encoder (VAE) model ε-D 204, and a CLIP model 206. During the training phase, input images x 208 in pixel space 210 are projected into a latent space 212 via the pre-trained VAE model ε-D 204. A diffusion process is performed to corrupt the input images 208 with a randomly sampled time step t. The latent diffusion model 202 includes a 3D U-Net decoder $\varepsilon_\theta$ to denoise the corrupted frames $$x_t^{[k]}$$

into a generated image x' 214.

Figure 3:
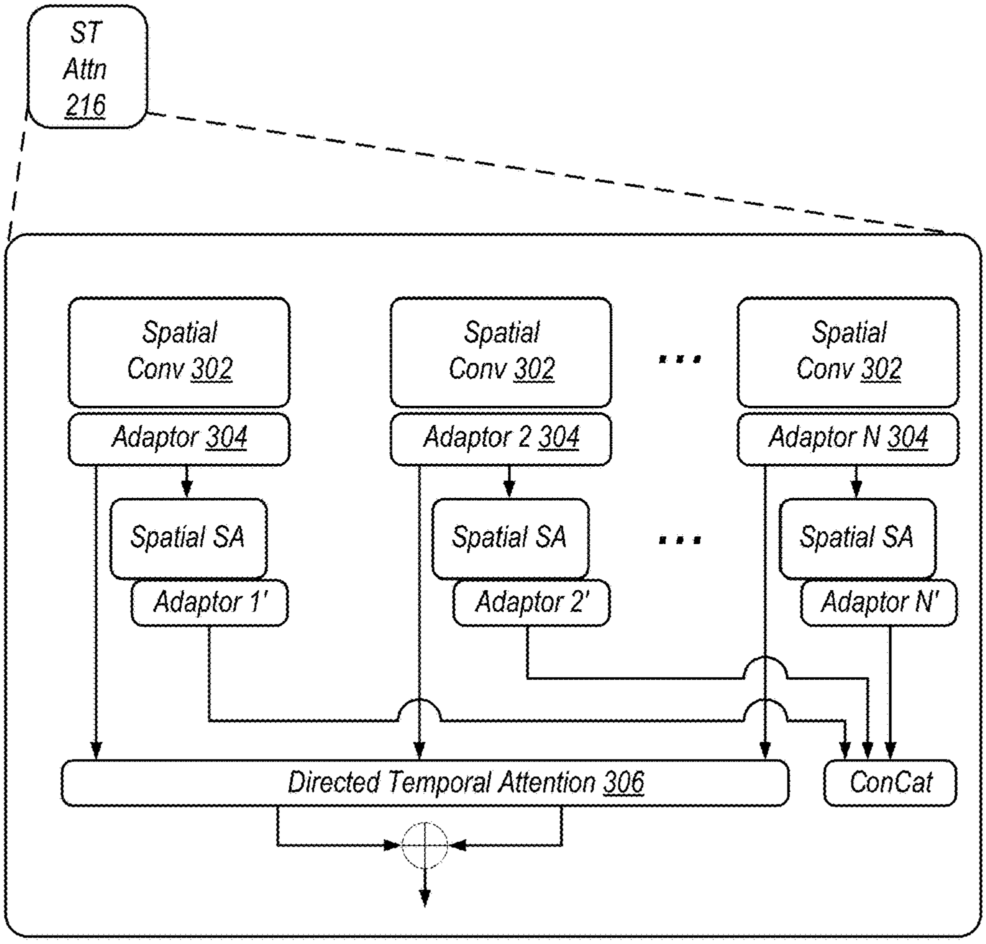
FIG. 3 shows a diagram schematically illustrating an example spatiotemporal attention module.

The conventional operator for video data processing is the 3D convolution. However, the computation complexity and hardware compatibility of 3D convolution are significantly worse than 2D convolution. The computation complexity can be simplified to use a 2D convolution along the spatial dimension followed by a 1D convolution along the temporal dimension. The framework presented further simplifies the computation complexity by using a spatiotemporal attention 216 implementing a plurality of 2D convolutions, each in combination with an adaptor, where the adaptor is a simpler operator than a 1D convolution. FIG. 3 shows a diagram schematically illustrating the spatiotemporal attention module 216 in further detail. As shown, the spatiotemporal attention module 216 includes a plurality of 2D convolutions 302, each associated with a unique adaptor 304. Given a set of N video frames, a shared 2D convolution can be enforced for all frames to extract the spatial features. Then, a set of distribution adjustment parameters can be assigned to adjust the mean and variance for every single frame via:

$$x_t^j = S_t^j * Conv2d(x_t^f) + B_t^j,$$

where $$x_t^f$$

denotes the feature of the f-th frame at denoising time step t. $S_n$ and $B_n$ are two groups of learnable parameters used for variance adjustment and shift adjustment of the extracted features $z_t$. As the frames within each video clips are typically semantically similar, the small differences among frames can be modelled via a small group of parameters rather than a dedicated 1D convolution layer.

Figure 4:
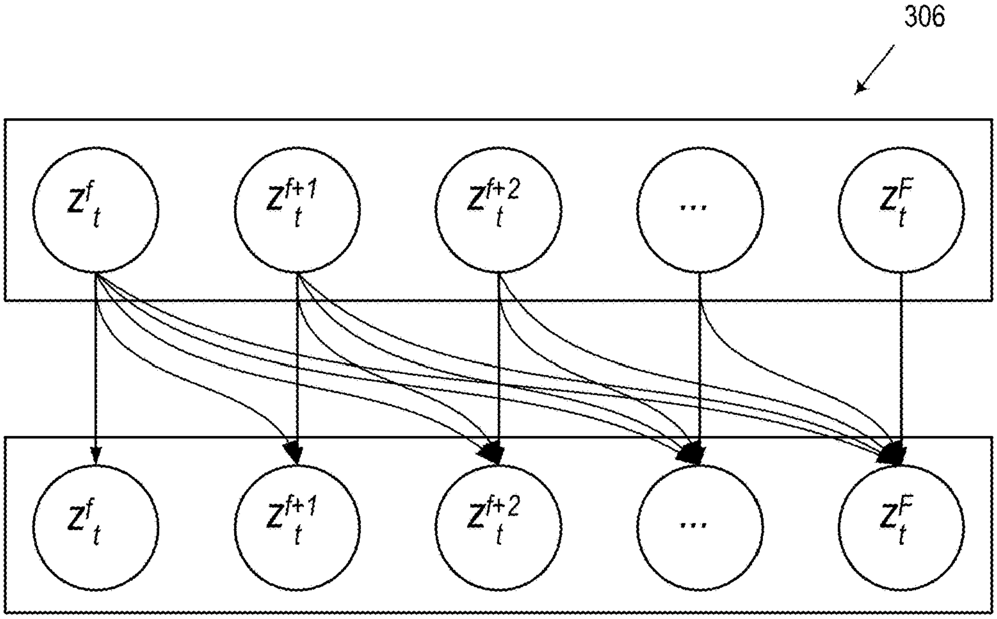
FIG. 4 shows a diagram schematically illustrating an example directed temporal self-attention module.

Previous methods use conventional self-attention along the temporal dimension for the learning of the motion in the video dataset. However, in video data, the frames are expected to be changing in a regular pattern along the temporal dimension. To inject the temporal dependency among the frames, the spatiotemporal attention module includes a directed temporal self-attention module 306. FIG. 4 shows a diagram schematically illustrating the directed temporal self-attention module 306 in further detail. With a set of given video frames, $x_t \varepsilon R^{B \times F \times C \times H \times W}$ where F denotes the number of frames. First, $x_t$ is reshaped into shape BHWC×F. Each pixel of each frame is treated as a token. $Q_t$, $K_t$, and $V_t$ are calculated from three linear transformations. A similarity matrix, $A^t \in R^{H \times F \times F}$, can be calculated via:

$$\text{Attention}_t = \text{SoftMax}(Q_t K_t^T / \sqrt{d}) M V_t,$$

where d is the channel embeddings per head and M is an upper triangular mask over the attention matrix such that $M_{m,n}=0$ if m>n, else 1.

The output of the spatiotemporal attention can then be calculated via:

$$x_t = \text{Attention}_t + \text{Attention}_s,$$

where $\text{Attention}_s$ is a standard multi-head cross self-attention module as used in vision transformers. With the application of the mask, the present token is only affected by the previous tokens and independent from the future tokens.

Different from image datasets, each video contains a wide range of total frame numbers, which can range hundreds to even thousands of frames. As such, it can be impractical to process every frame contained within each video using a single forward pass due to the computational and memory cost. A typical practice is to sample a small subset and use it to represent the whole video. However, a unified sampling strategy would result in the same subset of sampled key frames containing different amounts of information, thus increasing the difficulty of training. To ease the training and make the generation more controllable, the framework provides for a sampling strategy where a small portion of the video is first randomly sampled and then a predetermined number of frames within the small portion are uniformly sampled. In some implementations, the subset of the video randomly sampled ranges from approximately 5% to approximately 15% of the video. The predetermined number of frames can also vary. In some implementations, three frames are uniformly sampled for training, where the first and the third frames can be used as the conditions and are concatenated to the second frame along the channel dimension. In other implementations, sixteen frames are uniformly sampled for training. A corresponding frames-per-second (FPS) can be calculated based on the sampling frames and appended to the training data. In this manner, the smoothness of the generated video can be controlled. For example, when a low FPS value is specified, the distance between adjacent frames is expected to be larger. Thus, the overall action space contained by the generated videos is expected to be wider. In contrast, when a high FPS is specified, the action space contained by the generated videos are expected to be narrower but smoother.

For the loss function, an image reconstruction loss for the training of the framework can be utilized. Specifically, given a set of video frames, the loss can be calculated via:

$$\mathcal{L} = \sum_{i=0}^{F} \left| x_0^i - \epsilon_\theta(z_0^i, 0, y) \right|$$

In order to increase the temporal resolution of the generated video, which includes only key frames at the current stage, a separate frame interpolation network can be implemented to insert a transition frame into any two adjacent generated frames. The interpolation model can also be trained in latent space by using a VAE model to encode both conditional RGB frames into the 4-channel latent vector, which can then be concatenated channel-wise together with the noisy $x_t$ (the noised target at time step t). A third latent vector can be spherically interpolated from the two conditional latent vectors as extra information to concatenate into the input, which brings the total channels of the network input to sixteen.

Figure 5:
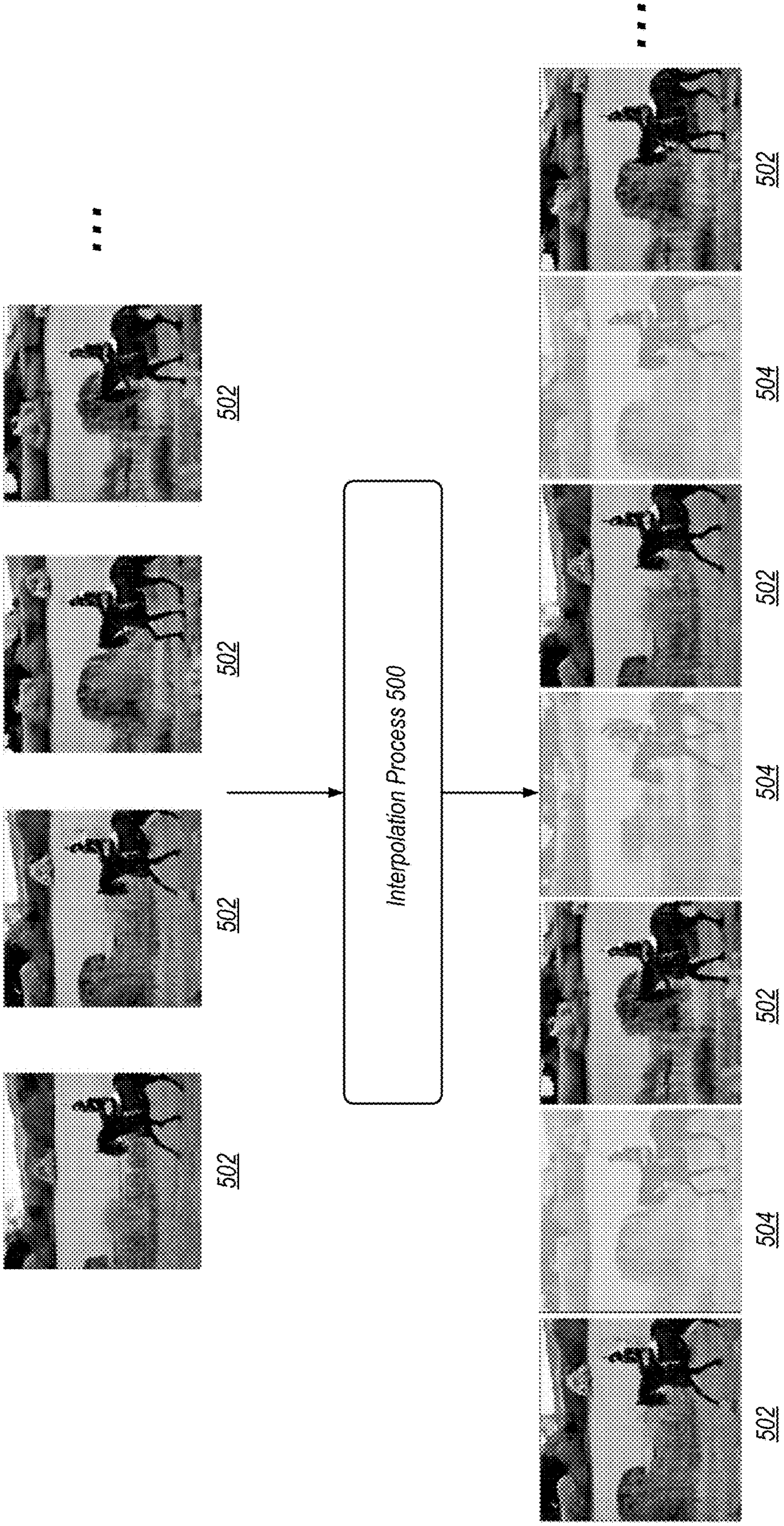
FIG. 5 shows a diagram schematically illustrating an example interpolation process of key frames.

FIG. 5 shows a diagram schematically illustrating an example interpolation process 500 of key frames. The process 500 includes receiving a set of key frames 502, which can be generated using a latent diffusion model using methods described above. The key frames 502 can vary in number and spatial resolution. For each pair of adjacent key frames, a transition frame can be generated and inserted. For example, given a set of N key frames, N−1 transition frames can be generated and inserted to form 2N−1 frames, thereby increasing the temporal resolution of the final generated video. The transition frame 504 can be generated using an interpolation model such as the one described above. In some implementations, at least two transition frames are generated and inserted between a pair of adjacent key frames.

The interpolation process can be recursively performed to further increase the temporal resolution of the generated video. The number of recursion iterations can depend on various factors, including desired video quality and computing resources available. The number of key frames generated in the previous steps can affect the computational resources needed for performing a single iteration of the interpolation process. In some implementations, sixteen key frames are generated, and the interpolation process is performed twice, resulting in a total number of sixty-one frames.

To generate high-resolution videos, a diffusion-based super-resolution model, trained on pixel space, can be used to upsample the key frames and the interpolated transition frames. Key frames can be generated at various spatial resolutions. In some implementations, the key frames are generated with a spatial resolution of 256×256 pixels. Similarly, upsampling the frames can be performed at different spatial resolutions. In some implementations, the frames are upsampled from 256×256 to 1024×1024 resolution. The super-resolution model can be trained on image datasets instead of video datasets. To reduce the computation and memory costs, the model can be trained on 512×512 random crops of 1024×1024 images for 1 million iterations. In some cases, noise conditioning augmentation on super-resolution can be important for generating high-fidelity images. In some implementations, gaussian noise of a random level is added to the low-resolution image, and the diffusion model is conditioned on the noise level.

Figure 6:
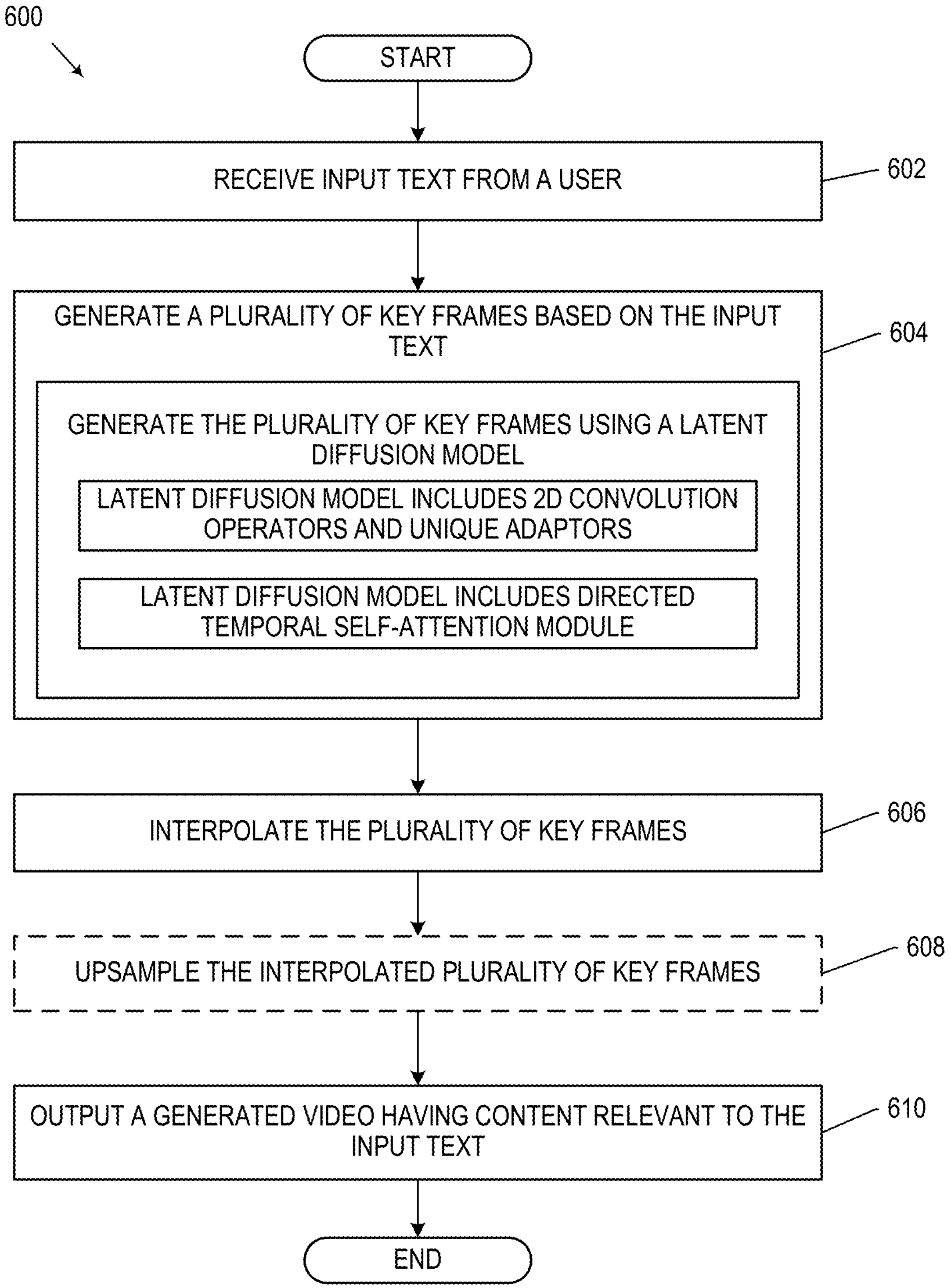
FIG. 6 shows a flow diagram illustrating an example method of generating a video based on input text.

FIG. 6 shows a flow diagram illustrating an example method 600 of generating a video based on input text. At step 602, the method 600 includes receiving input text from a user. The input text can be received via various input modules and can be of various forms and formats. In some implementations, the input text is a sentence describing content of the video to be generated. The input text can also be incomplete sentences or multiple sentences. In some implementations, natural language processing techniques are used to parse the input text.

At step 604, the method 600 includes generating a plurality of key frames based on the received input text. The plurality of key frames can be generated using a latent diffusion model. In some implementations, a CLIP-guided latent diffusion process is performed to generate the key frames individually. The number of key frames generated can be predetermined and can depend on various factors. For example, a user set the predetermined number of key frames to be generated. Spatial resolution of the generated key frames can also vary. In some implementations, sixteen key frames having a spatial resolution of 256×256 pixels are generated.

The latent diffusion model can include a spatiotemporal attention head that content and temporal information from which the key frame can be generated. The spatiotemporal attention head can include a plurality of two-dimensional convolution operators and a plurality of adaptors to learn the frames' specific features, where each 2D convolution operator is paired with a unique adaptor. Since frames of a video mostly overlap, the combined use of 2D convolution operators and unique adaptors can be sufficient to process the frames. Such use drastically reduces computational time compared to the use of 3D convolution operators. The spatiotemporal attention head can further include a directed temporal self-attention module that provides temporal information among the frames for generating a temporally meaningful sequence of frames, where a given frame is calculated based on all previous frames with the previous frames unaffected by the future frames.

At step 606, the method 600 includes interpolating the plurality of key frames. The plurality of key frames can be interpolated using a separate frame interpolation network to increase its temporal resolution. The interpolation model can be trained in latent space. In some implementations, a transition frame is inserted between each pair of adjacent key frames. For example, given a set of N key frames, N−1 transition frames can be generated and inserted to form 2N−1 frames. More than one frame can be inserted between a pair of adjacent key frames. The interpolation process can also be performed recursively to further increase the temporal resolution of the frames. For example, given a set of N key frames, an interpolation process can be performed to form a set of 2N−1 frames. Another interpolation process can be performed on the new set of 2N−1 frames to form a set of 4N−3 frames.

At step 608, the method 600 optionally upsampling the interpolated plurality of key frames. The frames can be upsampled using a super-resolution model. In some implementations, the super-resolution model is trained on high-resolution video datasets. In other implementations, the super-resolution model is trained on image datasets, including high-resolution image datasets. Frames of various spatial resolution can be upsampled to higher spatial resolutions. In some implementations, frames having a spatial resolution of 256×256 pixels are upsampled to 1024×1024.

At step 610, the method 600 includes outputting a video having content relevant to the input text.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
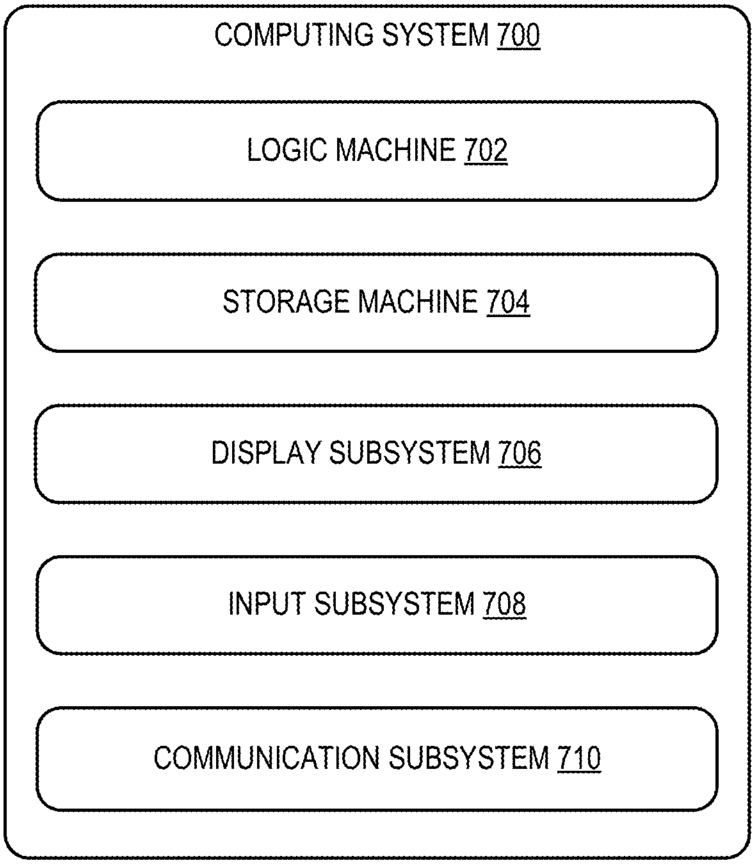
FIG. 7 schematically shows a non-limiting embodiment of a computing system that can enact one or more of the methods and processes described above.

FIG. 7 schematically shows a non-limiting embodiment of a computing system 700 that can enact one or more of the methods and processes described above. Computing system 700 is shown in simplified form. Computing system 700 may embody the computer device 102 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine 702 optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine 702 to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine 704, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem 708 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem 710 may be configured for communication via a wireless telephone network, or a wired or wireless local- or wide-area network. In some embodiments, the communication subsystem 710 may allow computing system 700 to send and/or receive messages to and/or from other devices via a network such as the Internet.

The following paragraphs provide additional support for the claims of the subject application. One aspect provides a computing system for video generation corresponding to an input text, the computing system including a processor and memory of a computing device. The processor is configured to execute a program using portions of the memory to receive the input text from a user, generate a plurality of key frames based on the input text using a latent diffusion model, interpolate the plurality of key frames, and output a video using the interpolated plurality of key frames. In this aspect, additionally or alternatively, the processor is further configured to upsample the interpolated plurality of key frames. In this aspect, additionally or alternatively, upsampling the interpolated plurality of key frames includes using a super-resolution model. In this aspect, additionally or alternatively, the latent diffusion model includes a plurality of convolution operators in two-dimensional space. In this aspect, additionally or alternatively, the latent diffusion model includes a unique adaptor for each of the convolution operators in two-dimensional space. In this aspect, additionally or alternatively, the latent diffusion model includes a directed temporal self-attention module. In this aspect, additionally or alternatively, the plurality of key frames is generated using the directed temporal self-attention module such that key frames are calculated based on previous frames, wherein the previous frames are unaffected by future frames. In this aspect, additionally or alternatively, interpolating the plurality of key frames include generating and inserting a transition frame between two adjacent key frames in the plurality of key frames. In this aspect, additionally or alternatively, interpolating the plurality of key frames includes generating and inserting a plurality of transition frames between two adjacent key frames in the plurality of key frames. In this aspect, additionally or alternatively, interpolating the plurality of key frames includes recursively, for a number of predetermined iterations, generating and inserting a transition frame between every two adjacent key frames in the plurality of key frames.

Another aspect provides a computerized method for video generation corresponding to an input text, the method including receiving the input text from a user, generating a plurality of key frames based on the input text using a latent diffusion model, interpolating the plurality of key frames, and outputting a video using the interpolated plurality of key frames. In this aspect, additionally or alternatively, the method further includes upsampling the interpolated plurality of key frames. In this aspect, additionally or alternatively, the latent diffusion model includes a plurality of convolution operators in two-dimensional space. In this aspect, additionally or alternatively, the latent diffusion model includes a unique adaptor for each of the convolution operators in two-dimensional space. In this aspect, additionally or alternatively, the latent diffusion model includes a directed temporal self-attention module. In this aspect, additionally or alternatively, the plurality of key frames is generated using the directed temporal self-attention module such that key frames are calculated based on previous frames, wherein the previous frames are unaffected by future frames. In this aspect, additionally or alternatively, interpolating the plurality of key frames include generating and inserting a transition frame between two adjacent key frames in the plurality of key frames. In this aspect, additionally or alternatively, interpolating the plurality of key frames includes generating and inserting a plurality of transition frames between two adjacent key frames in the plurality of key frames. In this aspect, additionally or alternatively, interpolating the plurality of key frames includes recursively, for a number of predetermined iterations, generating and inserting a transition frame between every two adjacent key frames in the plurality of key frames.

Another aspect provides a computing system for video generation corresponding to an input text, the computing system including a processor and memory of a computing device. The processor is configured to execute a program using portions of the memory to receive the input text from a user and to generate a plurality of key frames based on the input text using a latent diffusion model. The latent diffusion model includes a plurality of convolution operators in two-dimensional space, a plurality of adaptors, where each adaptor is associated with a different convolution operator, and a directed temporal self-attention module for capturing temporal information among the plurality of key frames. The processor is further configured to interpolate the plurality of key frames by, for each pair of adjacent key frames, generating and inserting a transition frame between the pair of adjacent key frames. The processor is further configured to upsample the interpolated plurality of key frames using a super-resolution model and to output a video using the upsampled plurality of key frames.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for video generation corresponding to an input text, the computing system comprising:
- a processor and memory of a computing device, the processor being configured to execute a program using portions of the memory to:
  - receive the input text from a user;
  - generate a plurality of key frames based on the input text using a latent diffusion model, wherein the latent diffusion model includes a shared two-dimensional convolution for the generation of the plurality of key frames, and wherein the latent diffusion model further includes, for each of the plurality of key frames, a respective adaptor comprising a plurality of learnable parameters for adjusting a mean and a variance of the key frame;
  - interpolate the plurality of key frames; and
  - output a video using the interpolated plurality of key frames.

2. The computing system of claim 1, wherein the processor is further configured to upsample the interpolated plurality of key frames.

3. The computing system of claim 2, wherein upsampling the interpolated plurality of key frames includes using a super-resolution model.

4. The computing system of claim 1, wherein the latent diffusion model includes a directed temporal self-attention module.

5. The computing system of claim 4, wherein the plurality of key frames is generated using the directed temporal self-attention module such that key frames are calculated based on previous frames, wherein the previous frames are unaffected by future frames.

6. The computing system of claim 1, wherein interpolating the plurality of key frames include generating and inserting a transition frame between two adjacent key frames in the plurality of key frames.

7. The computing system of claim 1, wherein interpolating the plurality of key frames includes generating and inserting a plurality of transition frames between two adjacent key frames in the plurality of key frames.

8. The computing system of claim 1, wherein interpolating the plurality of key frames includes recursively, for a number of predetermined iterations, generating and inserting a transition frame between every two adjacent key frames in the plurality of key frames.

9. A computerized method for video generation corresponding to an input text, the method comprising:
- receiving the input text from a user;
- generating a plurality of key frames based on the input text using a latent diffusion model, wherein the latent diffusion model includes a shared two-dimensional convolution for the generation of the plurality of key frames, and wherein the latent diffusion model further includes, for each of the plurality of key frames, a respective adaptor comprising a plurality of learnable parameters for adjusting a mean and a variance of the key frame;
- interpolating the plurality of key frames; and
- outputting a video using the interpolated plurality of key frames.

10. The method of claim 9, further comprising upsampling the interpolated plurality of key frames.

11. The method of claim 9, wherein the latent diffusion model includes a directed temporal self-attention module.

12. The method of claim 11, wherein the plurality of key frames is generated using the directed temporal self-attention module such that key frames are calculated based on previous frames, wherein the previous frames are unaffected by future frames.

13. The method of claim 9, wherein interpolating the plurality of key frames include generating and inserting a transition frame between two adjacent key frames in the plurality of key frames.

14. The method of claim 9, wherein interpolating the plurality of key frames includes generating and inserting a plurality of transition frames between two adjacent key frames in the plurality of key frames.

15. The method of claim 9, wherein interpolating the plurality of key frames includes recursively, for a number of predetermined iterations, generating and inserting a transition frame between every two adjacent key frames in the plurality of key frames.

16. A computing system for video generation corresponding to an input text, the computing system comprising:

a processor and memory of a computing device, the processor being configured to execute a program using portions of the memory to:

receive the input text from a user;

generate a plurality of key frames based on the input text using a latent diffusion model, wherein the latent diffusion model includes:

a shared two-dimensional convolution for the generation of the plurality of key frames;

for each of the plurality of key frames that is to be generated, a respective adaptor comprising a plurality of learnable parameters for adjusting a mean and a variance of the key frame; and a directed temporal self-attention module for capturing temporal information among the plurality of key frames;

interpolate the plurality of key frames by, for each pair of adjacent key frames, generating and inserting a transition frame between the pair of adjacent key frames, wherein the interpolation is performed by an interpolation model trained in latent space; and upsample the interpolated plurality of key frames using a super-resolution model; and output a video using the upsampled plurality of key frames.

* * * * *